United States Patent
Ozaki (10) Patent No.: US 7,076,693 B2
(45) Date of Patent: Jul. 11, 2006

(54) DISC DRIVE AND RECORDING-DISC LOADING CONTROL METHOD

(75) Inventor: Koji Ozaki, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 10/321,649

(22) Filed: Dec. 18, 2002

(65) Prior Publication Data

US 2003/0093618 A1 May 15, 2003

Related U.S. Application Data

(63) Continuation of application No. PCT/JP00/04916, filed on Jul. 21, 2000.

(51) Int. Cl.
*G06F 11/00* (2006.01)

(52) U.S. Cl. .......................... 714/42; 711/133

(58) Field of Classification Search ................ 714/42; 711/133, 135
See application file for complete search history.

(56) References Cited

U.S. PATENT DOCUMENTS

| | | | | |
|---|---|---|---|---|
| 5,025,432 A | * | 6/1991 | Naito | 369/30.28 |
| 5,177,728 A | * | 1/1993 | Otsubo et al. | 369/47.24 |
| 5,829,017 A | * | 10/1998 | Ohtsuka | 711/113 |
| 6,393,523 B1 | * | 5/2002 | Peng et al. | 711/125 |
| 6,493,301 B1 | * | 12/2002 | Park | 369/53.15 |
| 2002/0159382 A1 | * | 10/2002 | Ohata et al. | 369/275.3 |

FOREIGN PATENT DOCUMENTS

| | | |
|---|---|---|
| JP | 5-234335 | 9/1993 |
| JP | 7-253935 | 10/1995 |
| JP | 9-167472 | 6/1997 |

* cited by examiner

*Primary Examiner*—Dieu-Minh Le
(74) *Attorney, Agent, or Firm*—Staas & Halsey LLP (57) ABSTRACT

A disc drive (A) for data transfer between a magneto-optical disc (B) and a host (C) is provided. The disc drive reads and stores in a RAM (12) medium identification information unique to the magneto-optical disc (B) and DMA information (B2) including a list of addresses indicating defective areas upon loading, and performs address conversion with reference to the DMA information (B2) for the data transfer. A CPU (11) checks if the medium identification information obtained when loading the magneto-optical disc (B) is identical with or different from medium identification information obtained in the previous loading. The CPU (11) allows the reading of DMA information (B2) and replacing of the previous DMA information remaining in a DMA information storage area (12D) of the RAM (12) with the newly obtained DMA information only when the newly obtained medium identification information is different from the previous medium identification information.

16 Claims, 9 Drawing Sheets

PRIOR ART

DISC DRIVE AND RECORDING-DISC LOADING CONTROL METHOD

REFERENCE TO RELATED APPLICATION

This application is a continuation of International Application PCT/JP00/04916 filed Jul. 21, 2000.

TECHNICAL FIELD

The present invention relates to a disc drive which is loaded with a removable recording disc such as a magneto-optical disc, and to a control method therefor for loading the recording disc.

BACKGROUND ART

Recent magneto-optical discs have increasingly large capacities, and accordingly can allow an increasing number of defective sectors to be therein. This means increase in the volume of information contained in DMA (Defect Management Area) which is an address list of defective sectors in the magneto-optical disc. A result is a tendency of prolonged time for loading (a set of procedures which immediately follow disc insertion). For example, a magneto-optical disc having a capacity of 1.3 GB needs a loading time of about twelve seconds. The capacity of magneto-optical disc will be increased further in the future, which could lead to a longer loading time. So, there is a need for a technique to quicken the loading or reducing the loading time.

Figure 8:
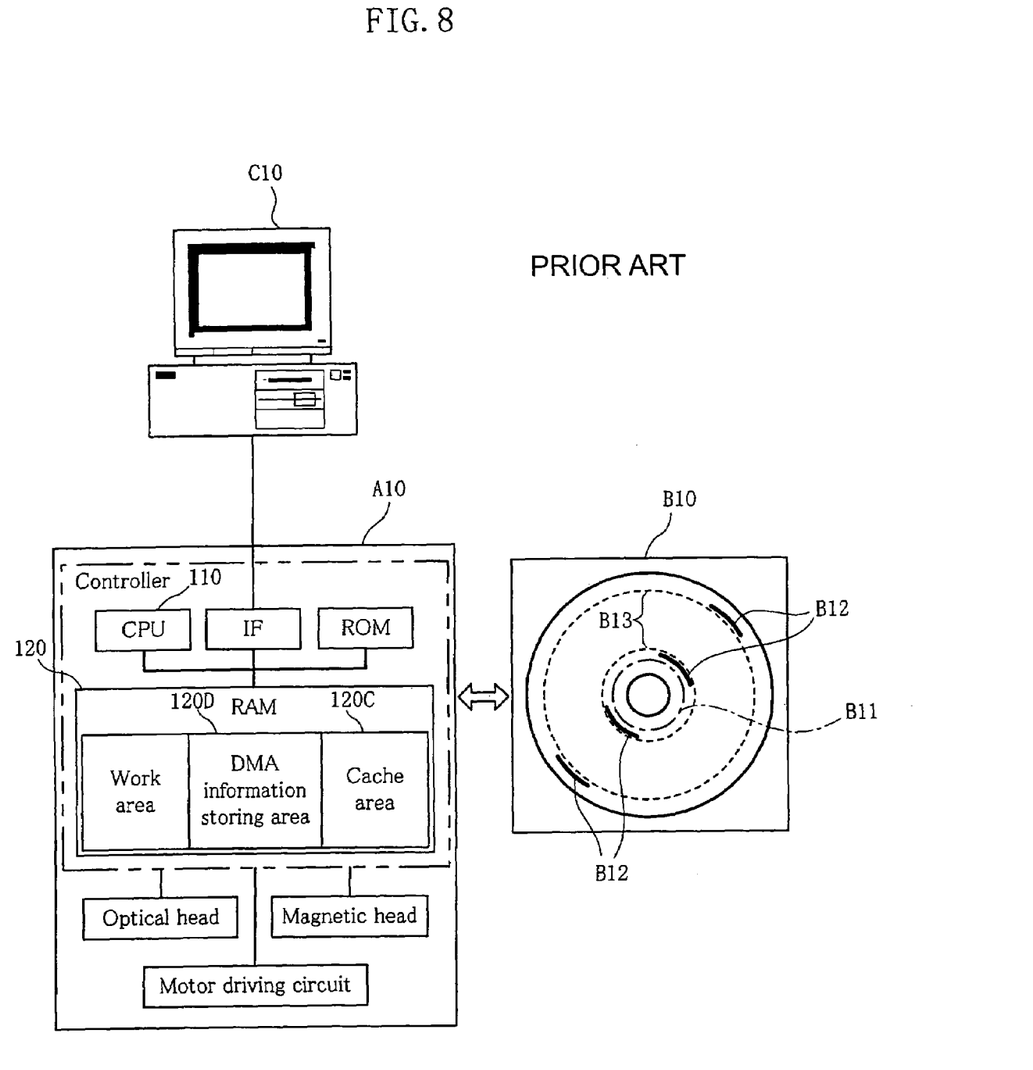
FIG. 8 is a block diagram for describing a convention.

FIG. 8 shows a conventional disc drive A10. When a magneto-optical disc B10 is loaded, a CPU 110 reads a control track B11 of the magneto-optical disc B10 and identifies a type of the disc.

Once the type is identified, the CPU 110 obtains physical addresses on the magneto-optical disc B10, of areas where DMA information B12 is stored. Then, the CPU 110 reads a total of four areas, starting from two areas in an innermost region and then two other areas in an outermost region of a recording area B13 of the magneto-optical disc B10, thereby obtaining and then storing the DMA information B12 in a DMA information storage area 120D of a RAM 120 serving as a buffer memory.

The DMA information B12 includes PDL (Primary Defect List) and SDL (Secondary Defect List). These are addresses lists of defective sectors on the magneto-optical disc B10.

Figure 9:
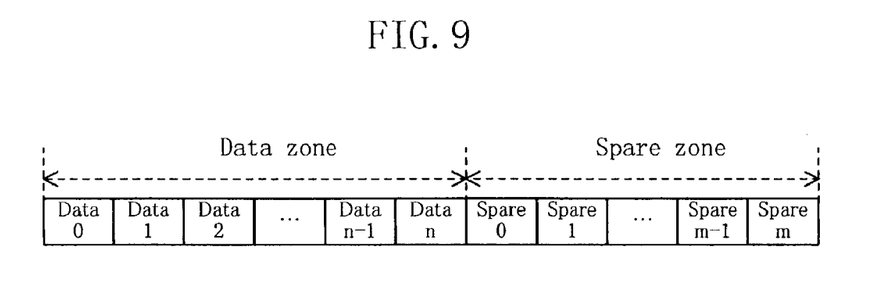
FIG. 9 is a diagram illustrating a zone without defect.
Figure 10:
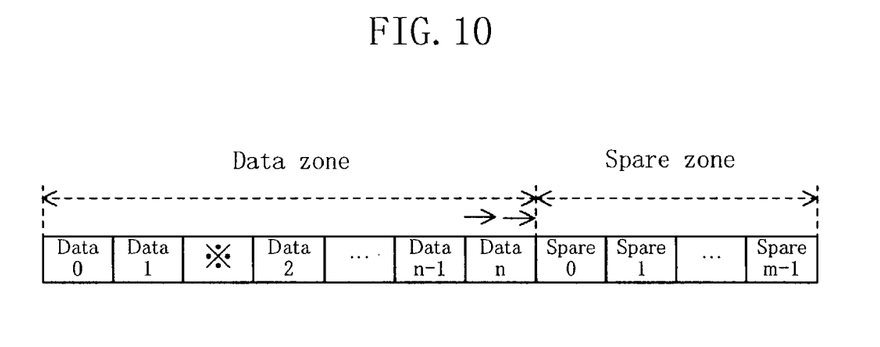
FIG. 10 is a diagram for describing PDL and a primary defect.

Description will be made specifically for the PDL. Now, compare FIG. 9 and FIG. 10: when a defective sector is detected in a zone during the physical formatting of a magneto-optical disc B10, the defective sector is skipped by the step of writing initializing data, and this zone which includes the defective sector is extended into a spare zone in order to provide a predetermined number of flawless sectors by using a spare sector available in the spare zone. The physical address- of the defective sector is recorded in the DMA information B12 for management of the medium. Such a defect, i.e. a defect in which an address can be assigned while skipping defective sectors, is called primary defect. A collection of addresses of the defective sectors that fall into the category of primary defect is called PDL.

Figure 11:
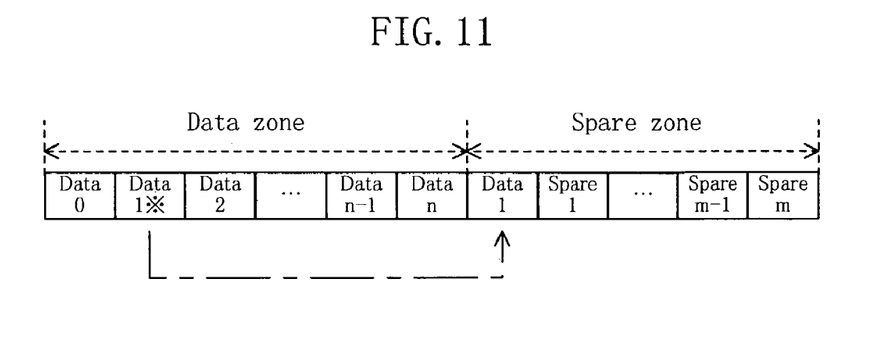
FIG. 11 is a diagram for describing SDL and a secondary defect.

Now about the PDL. Compare FIG. 9 and FIG. 11: when a defective sector is detected in a zone while writing data, the data is written onto another sector in the spare zone, in place of the defective sector. Then, the address of the defective sector and the address of the spare sector which replaced the defective sector are recorded onto the DMA information B12. Such a defect, i.e. a defect in which a replacing spare sector can be specified by address conversion, is called secondary defect. A collection of addresses of the defective sectors that fall into the category of secondary defect is called SDL.

When loading a magneto-optical disc B10, logical addresses given by the host C10 must be converted to physical addresses. For this reason, it is always necessary to read DMA information B12, and in order to verify integrity of the DMA information B12, all the four pieces of DMA information B12 must be read. This is to overcome a possible accidental situation in which power supply is cut off during sector conversion operation for a newly found second defect detected while data is written onto the magneto-optical disc B10. In such an accidental situation, the DMA information B12 is potentially not updated completely due to interruption by an abnormal shutdown, and then, each piece of the DMA information B12 will not agree with each other. In order to overcome such a situation, it is necessary to use the most reliable DMA information B12.

When the loading is completed along the above procedure, the CPU 110 of the disc drive A10 can begin data reading and/or writing with the magneto-optical disc B10, in response to access commands from the host C10 and with reference to the PDL and SDL found in the obtained DMA information B12.

Particularly, when reading data from the recording area B13 of the magneto-optical disc B10, data transfer is performed via a cache area 120C of the RAM 120. Data copied onto the cache area 120C is held until the cache area 120C is over flown. Thus, when the host C10 requests reading of data from the same address as before, the CPU 110 does not need to go back to a seek operation control which involves mechanical movement of the reading heads, but simply can pick and transfer the copied data in the cache area 120C directly to the host C10.

Then, when an EJECT key is operated or an EJECT command is sent from the host C10 for ejecting the magneto-optical disc B10 from the disc drive A10, an unloading (a set of procedures for final ejection) operation is performed, which includes invalidation of the data remaining in the cache area 120C.

Now, when the same magneto-optical disc B10 as the previous disc is inserted again into the disc drive A10, conventionally, the CPU 110 simply and always performs the operation of reading all the four pieces of DMA information B12 from the magneto-optical disc B10 whether or not the DMA information B12 is the same.

Likewise, any data remaining in the cache area 120C after an unloading is invalidated. Thus, when the same magneto-optical disc B10 as the previous disc is inserted again into the disc drive A10 for loading, the CPU 110 begins the whole process of reading data newly from the magneto-optical disc B10 through the seek control operation, and then transfers the read data via the cache area 120C to the host C10.

In practical use of the drive, the user often does such a practice, i.e. that he ejects a magneto-optical disc B10 out of the disc drive A10 and then inserts the same magneto-optical disc B10 again into the disc drive A10, causing the drive to repeat the loading process.

For example, the user of ten wants to eject a magneto-optical disc B10 from the disc drive A10, in an attempt to check what is written on the label pasted onto the label region of the magneto-optical disc B10, to paste a label onto the label region, or to write a memo onto the label.

Another example is right after storing important data in a magneto-optical disc B10. The user often wants to protect the data from accidental erasure, and thus wants to turn on a write-protect switch or a tab on the hard case of the magneto-optical disc B10 which prevents further writing onto the disc.

However, even if the same magneto-optical disc B10 as the ejected is inserted again, and the host C10 sends a data access command to the disc drive A10 during the second loading, the CPU 110 is unable to begin the conversion process of the specified logical addresses to the physical addresses since the DMA information B12 containing the PDL and SDL is not available until the loading is complete. Thus, the CPU 110 must withstand the commanded accessing operation until the loading is over, resulting in a problem of delayed response to the host C10. The time necessary for this response becomes longer as the capacity of the magneto-optical disc B10 increases.

At the time of the second loading, the cache area 120 of the RAM 120 already holds some data copied from the magneto-optical disc B10, and there is a high probability that this data is hit. Yet, in the second loading, all the data remaining in the cache area 120C has been invalidated by the unloading process performed right before. Thus, when the second loading is complete and the host C10 sends a command for data reading, the CPU 110 cannot try to hit the data in the cache area 120C, and then always has to perform the seek operation which involves mechanical movement of the reading heads. Accordingly, a longer time must be spent before the host C10 is notified of the completion of the commanded task of data reading. So, again, there is a problem of delayed response to the host C10.

DISCLOSURE OF THE INVENTION

It is therefore an object of the present invention, as mentioned at the beginning, to reduce the loading time of the recording disc. More comprehensively and specifically, an object of the present invention is to provide a disc drive and a control method therefor for loading the recording disc, capable of reducing the response time when data reading and/or writing is performed before and after the same disc is ejected and then inserted again.

A first aspect of the present invention provides a disc drive for data transfer between a recording disc and a host. The disc drive reads and stores in a memory DMA information including medium identification information unique to the recording disc and a list of addresses indicating defective areas upon loading the recording disc, and performs address conversion with reference to the DMA information for the data transfer. The disc drive comprises: a determiner for checking if the medium identification information obtained when loading the recording disc is identical with or different from medium identification information obtained in the previous loading; and a memory controller for allowing the reading of DMA information and replacing the previous DMA information remaining in the memory with the obtained DMA information only when the determiner has found that the obtained medium identification information is different from the previous medium identification information.

A second aspect of the present invention provides a disc drive for data transfer between a recording disc and a host via a cache memory. The disc drive reads medium identification information unique to the recording disc upon loading the recording disc, and comprises: a determiner for checking if the medium identification information obtained when loading the recording disc is identical with or different from medium identification information obtained in the previous loading; and a memory controller for invalidating data remaining in the cache memory only when the determiner has found that the obtained medium identification information is different from the previous medium identification information.

A third aspect of the present invention provides a disc drive for data transfer between a recording disc and a host. The disc drive reads and stores in a memory DMA information including a list of addresses indicating defective areas upon loading the recording disc, and performs address conversion with reference to the DMA information for the data transfer. The disc drive comprises: a timer for measuring a disc changing time from a time of unloading a previous recording disc to a present time in the loading of the current recording disc; a determiner for checking if the disc changing time measured by the timer is longer than a predetermined norm time; and a memory controller for allowing the reading of DMA information and replacing the previous DMA information remaining in the memory with the obtained DMA information only when the determiner has found that the disc changing time is longer.

A fourth aspect of the present invention provides a disc drive for data transfer between a recording disc and a host via a cache memory after loading the disc, comprising: a timer for measuring a disc changing time from a time of unloading a previous recording disc to a present time in the loading of the current recording disc; a determiner for checking if the disc changing time measured by the timer is longer than a predetermined norm time; and a memory controller for invalidating data remaining in the cache memory only when the determiner has found that the disc changing time is longer.

A fifth aspect of the present invention provides a recording disc loading control method for data transfer between a recording disc and a host. The disc drive reads and stores in a memory DMA information including medium identification information unique to the recording disc and a list of addresses indicating defective areas upon loading the recording disc, and performs address conversion with reference to the DMA information for the data transfer. The method comprises: a determining step of checking if the medium identification information obtained when loading the recording disc is identical with or different from medium identification in formation obtained in the previous loading; and a memory controlling step of allowing the reading of DMA information and replacing the previous DMA information remaining in the memory with the obtained DMA information only when the determiner has found that the obtained medium identification information is different from the previous medium identification information.

A sixth aspect of the present invention provides a recording disc loading control method for data transfer between a recording disc and a host via a cache memory. The disc drive reads medium identification information unique to the recording disc upon loading the recording disc. The method comprises: a determining step of checking if the medium identification information obtained when loading the recording disc is identical with or different from medium identification information obtained in the previous loading; and a memory controlling step of invalidating data remaining in the cache memory only when the determiner has found that the obtained medium identification information is different from the previous medium identification information.

A seventh aspect of the present invention provides a recording disc loading control method for data transfer between a recording disc and a host. The disc drive reads and stores in a memory DMA information including a list of addresses indicating defective areas upon loading the recording disc, and performs address conversion with reference to the DMA information for the data transfer. The method comprises: a time measuring step of measuring a disc changing time from a time of unloading a previous recording disc to a present time in the loading of the current recording disc; a determining step of checking if the disc changing time measured by the timer is longer than a predetermined norm time; and a memory controlling step of allowing the reading of DMA information and replacing the previous DMA information remaining in the memory with the obtained DMA information only when the determiner has found that the disc changing time is longer.

An eighth aspect of the present invention provides a recording disc loading control method for data transfer between a recording disc and a host via a cache memory after loading the disc. The method comprises: a time measuring step of measuring a disc changing time from a time of unloading a previous recording disc to a present time in the loading of the current recording disc; a determining step of checking if the disc changing time measured by the timer is longer than a predetermined norm time; and a memory controlling step of invalidating data remaining in the cache memory only when the determiner has found that the disc changing time is longer.

According to the present invention, reading of DMA information in loading a recording disc is performed and previous data remaining in the cache memory is invalidated only when a recording disc being loaded is different from the previous recording disc or only after a relatively short disc changing time, which is too short to replace the ejected recording disc with another for example, has passed before the ongoing loading.

In other words, when the same recording disc is ejected and then re-inserted, the previous DMA information remaining in the memory is made available for continued use, without being replaced by new information, and data remaining in the cache memory from the previous loading is made available for continued use. Likewise, when insertion of a recording disc is made within a sufficiently short period of time after ejection, the inserted recording disc is regarded to be the ejected one, and thus, the previous DMA information remaining in the memory is made available for continued use, without being replaced by new information, and data remaining in the cache memory is made available for continued use.

Therefore, when a recording disc is ejected and then re-inserted for reading/writing of data, the step of reading DMA information is not performed in the second loading, and the time necessary for the loading is shorter accordingly than in the first time. Therefore, when a command is issued for reading/writing of data upon the second loading, it is possible to reduce response time to the host in data transfer. Likewise, when the same recording disc is ejected and then re-inserted for reading/writing of data, it is possible to use previous data remaining in the cache area even after the second loading. Therefore, when data is to be read upon the second loading of the second recording disc, the data can be hit in the cache area at a high probability, making possible to reduce response time accordingly.

Other features and advantages of the present invention will become clearer from the following description of embodiments to be presented with reference to the accompanying drawings.

BEST MODE FOR CARRYING OUT THE INVENTION

Hereinafter, a first embodiment of the present invention will be described with reference to FIG. 1 through FIG. 4. It should be noted first that in terms of physical configuration the first embodiment does not differ from the convention, and therefore, no more description will be made for those identical with the convention in FIG. 8.

Figure 1:
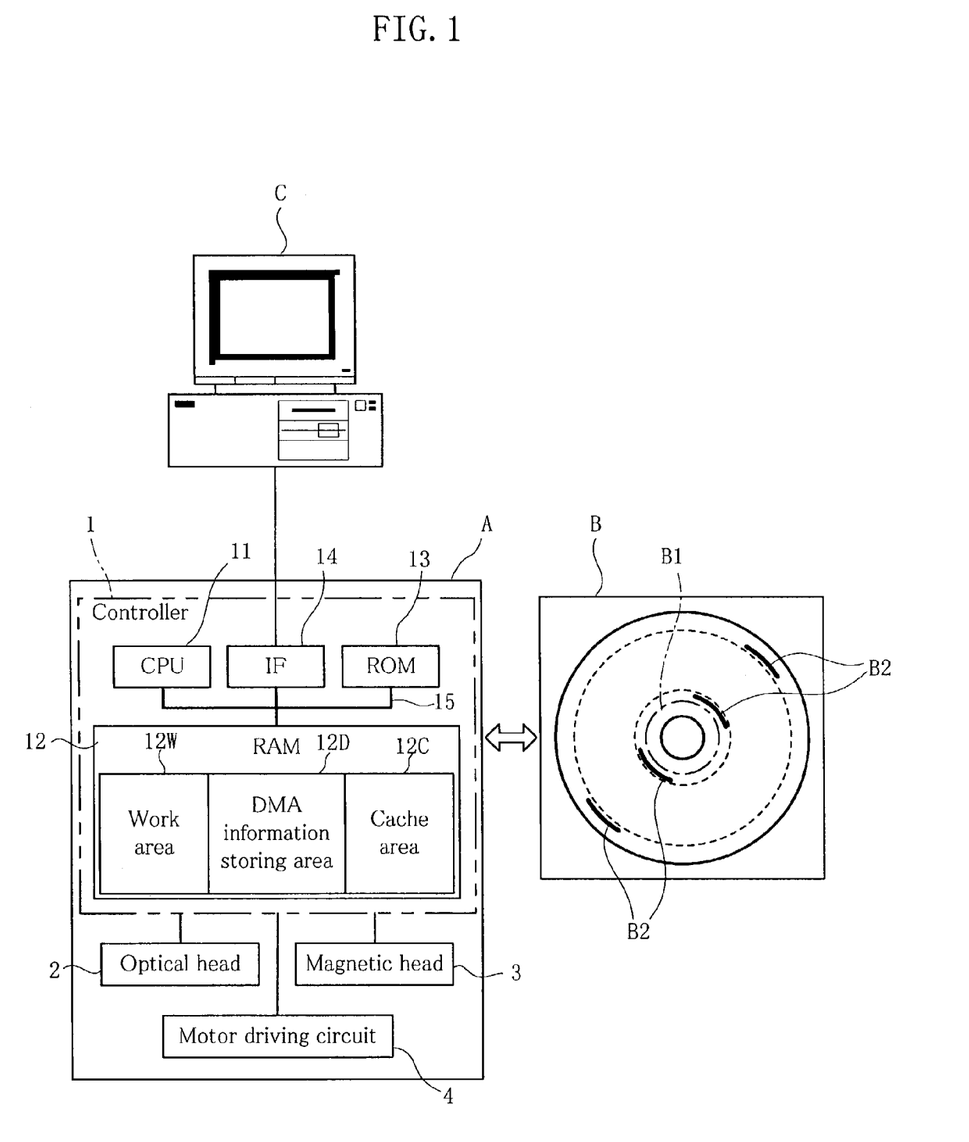
FIG. 1 is a block diagram of a first embodiment of the present invention.

As shown in FIG. 1, the first embodiment of the present invention uses a disc drive A capable of performing a loading operation, a magneto-optical disc B as a recording disc, and a personal computer C as a host which directs reading and writing of data. The personal computer C, operating conventionally on the basis of an OS (Operating System) which provides file managing capabilities, does not have any new essential characteristics, and therefore will not be described or illustrated in specific detail.

First, the magneto-optical disc B, which is the object to be loaded, will be described. The magneto-optical disc B can be provided by MO discs, of different capacities such as 230 MB, 540 MB, 640 MB, and 1.3 GB. The magneto-optical disc B includes a multiple of tracks (not illustrated) serving as a recording area B3 for storing data. Conceptually, the magneto-optical disc B has a number of sectors each made up of a fragmented division of the tracks. Generally, in a 640 MB magneto-optical disc for example, the entire recording area is divided into eleven zones from radially inward side toward radially outward side. In a 1.3 GB magneto-optical disc, the entire recording area is divided into eighteen zones from radially outward side toward radially inward side. In practical application, the tracks are often formed as a helix.

The magneto-optical disc B has more areas in its recording surface. Specifically, there are a couple of areas more outwardly, and another couple of areas more inwardly, of the recording area B3, and DMA information B2 is recorded in each of these four areas. The DMA information B2 includes PDL and SDL described earlier, i.e. lists of addresses of defective sectors on the recording area B3 of the magneto-optical disc B. When the magneto-optical disc B is accessed, reading is first made to a lead-in control track B1. Near the lead-in control track B1, medium identification information (not illustrated) is recorded. The medium identification information includes unique information for identifying and differentiating the magneto-optical disc B from others and a data update number which indicates how many updates are made on data. The unique information is written only once at the time of shipping the product or when the magneto-optical disc B is formatted. The number of updates is counted up every time the magneto-optical disc B is unloaded after the data on the recording area B3 is updated.

As shown in FIG. 1, the disc drive A includes a controller 1, an optical head 2, a magnetic head 3, and a motor driving circuit 4. The controller 1 includes a CPU 11, a RAM 12, a ROM 13, and an interface circuit 14. These CPU 11, RAM 12, ROM 13, and the interface circuit 14 are interconnected via a bus line 15. The bus line 15 includes a data bus, an address bus and a control signal bus.

The disc drive A, which works in response to various commands from the personal computer C, writes data onto the magneto-optical disc B and read data from the magneto-optical disc B. When the magneto-optical disc B is inserted into the disc drive A, a series of initial steps called loading is performed. On the other hand, a series of final steps called unloading is performed when ejecting the magneto-optical disc B. These steps will be described later in detail.

The controller 1 controls the optical head 2, the magnetic head 3, and the motor driving circuit 4 under the direction from the personal computer C. The optical head 2 and the magnetic head 3 make access to the unit recording areas (sectors) of the magneto-optical disc B, under the control provided by the controller 1. The motor driving circuit 4, controlled by the controller 1, drives a motor for turning the magneto-optical disc B and motors for moving the optical head 2 and the magnetic head 3. Each motor may be an individual motor, or there may be only one motor that drives all.

The CPU 11 provides control over the entire controller 1. The RAM 12 provides the CPU 11 with a work area 12W for storing various data and information. In addition to the work area 12W, The RAM 12 provides a DMA information storage area 12D for storing DMA information, and a cache area 12C for high-speed data transfer with the personal computer C. The ROM 13 stores programs for the CPU 11 to operate.

Figure 2:
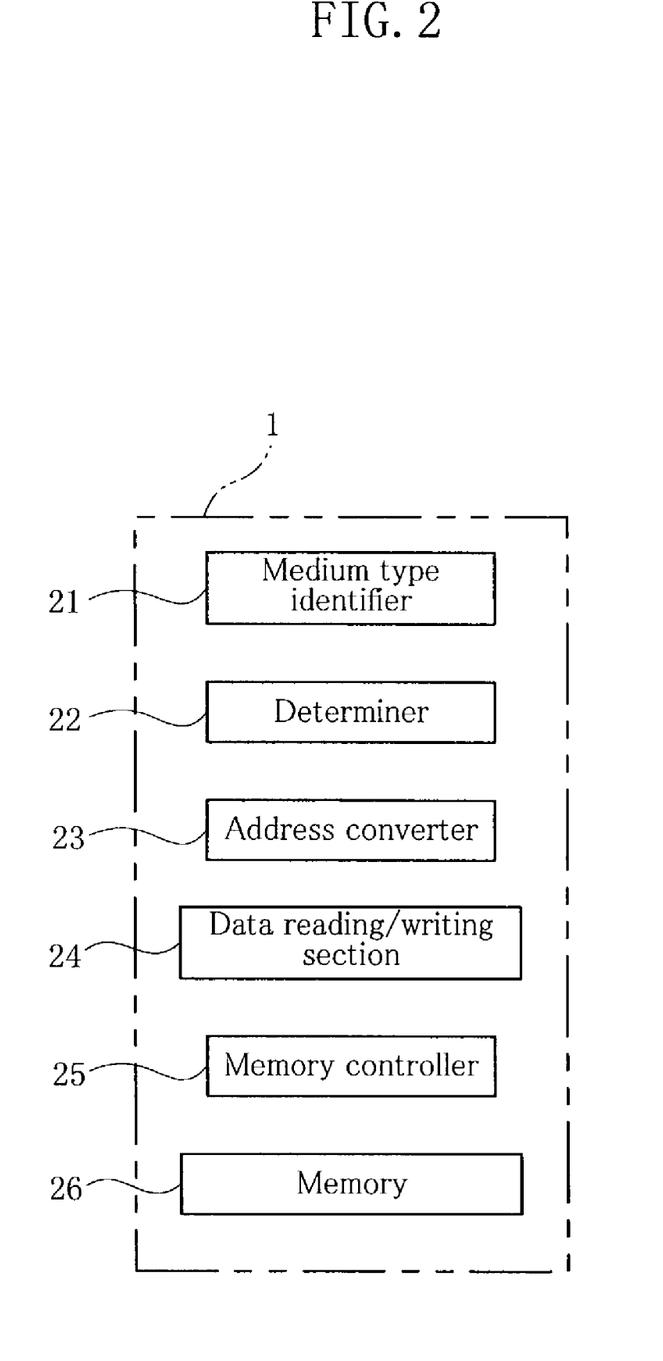
FIG. 2 is a function block diagram of a disc drive according to the first embodiment of the present invention.

The controller 1 can be illustrated as in a functional diagram in FIG. 2, and includes a medium type identifier 21, a determiner 22, an address converter 23, a data reading/writing section 24, a memory controller 25, and a memory 26. Specifically, the CPU 11 provides the medium type identifier 21, the determiner 22, the address converter 23, the data reading/writing section 24, and the memory controller 25. The RAM 12 provides the memory 26.

The medium type identifier 21 reads the medium identification information when the magneto-optical disc B is loaded, and identifies a type of the disc based on the unique information included therein.

The determiner 22 is called up at the time of loading a magneto-optical disc B, and checks if the magneto-optical disc B being loaded is the same as in the previous loading, based on the medium identification information. Specifically, the determiner 22 keeps medium identification information at the time of the previous loading, in the RAM 12 until medium identification information is read from the current magneto-optical disc B. The medium identification information at the time of the previous loading is the information that was used from the time of the previous loading to the time of the last unloading.

The address converter 23 reads DMA information B2 and stores it in the DMA information storage area 12D of the RAM 12 at the time of loading a magneto-optical disc B. Also, when the personal computer C requests reading/writing of data at specific logical addresses, the address converter makes reference to the DMA information B2, and obtains physical addresses. The DMA information B2 stored in the DMA information storage area 12D is held at the DMA information storage area 12D at least until the next loading.

The data reading/writing section 24 performs reading/writing of data and information in accordance with the physical addresses obtained by the address converter 23. Data read from a magneto-optical disc B is copied onto the cache area 12C of the RAM 12, and then transferred to the personal computer C via the cache area 12C. However, if the data to be read/written is already in the cache area 12C, the data reading/writing section 24 transfers the data directly from the cache area 12C to the personal computer C without performing seek control which involves mechanical movement of the heads. On the other hand, when data on a magneto-optical disc B is updated by reading and writing, the data reading/writing section 24 changes the data update number for the magneto-optical disc B, and writes this number as part of the medium identification information onto the magneto-optical disc B at the time of unloading the magneto-optical disc B.

The memory controller 25, which is called up when the determiner 22 has found that current medium identification information is different from medium identification information in the previous loading, have the address converter 23 read the current DMA information B12, and then replace the previous DMA information B12 remaining in the DMA information storage area 12D of the RAM 12, with the newly obtained DMA information B2. On the other hand, when the determiner 22 has found that current medium identification information is the same as in the previous loading, the memory controller 25 does not have the address converter 23 read DMA information B12 in the current loading process, and makes the previous DMA information B12 remaining in the DMA information storage area 12D of the RAM 12 available for use.

Further, when the determiner 22 has found that current medium identification information is different from medium identification information in the previous loading, the memory controller 25 invalidates data remaining in the cache area 12C of the RAM 12 in the current loading, and erase the data in the cache area 12C. On the other hand, when the determiner 22 has found that a current medium identification information is the same as in the previous loading, the memory controller 25 makes data remaining in the DMA information storage area 12D of the RAM 12 available for continued use.

Figure 3:
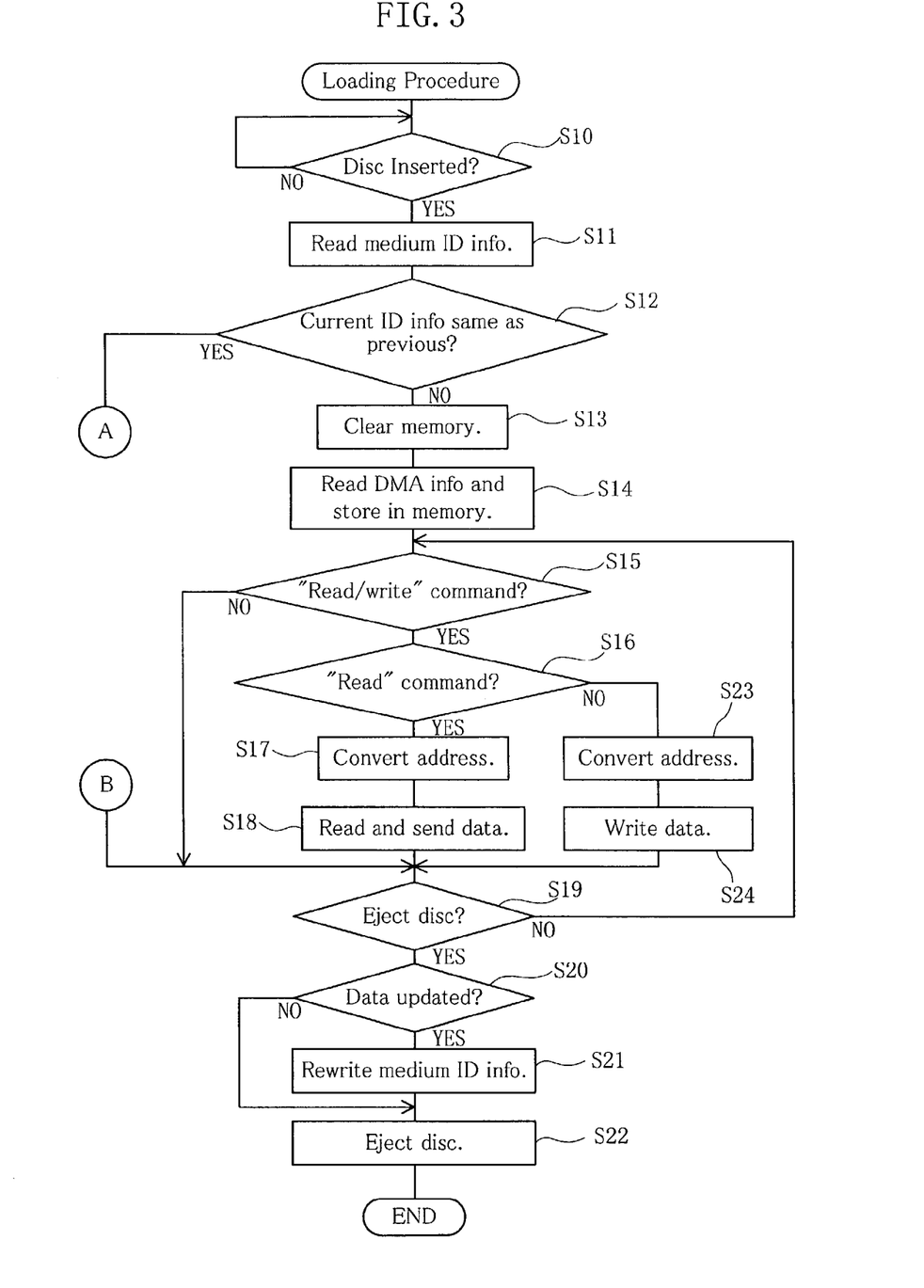
FIG. 3 is a flowchart according to the first embodiment.
Figure 4:
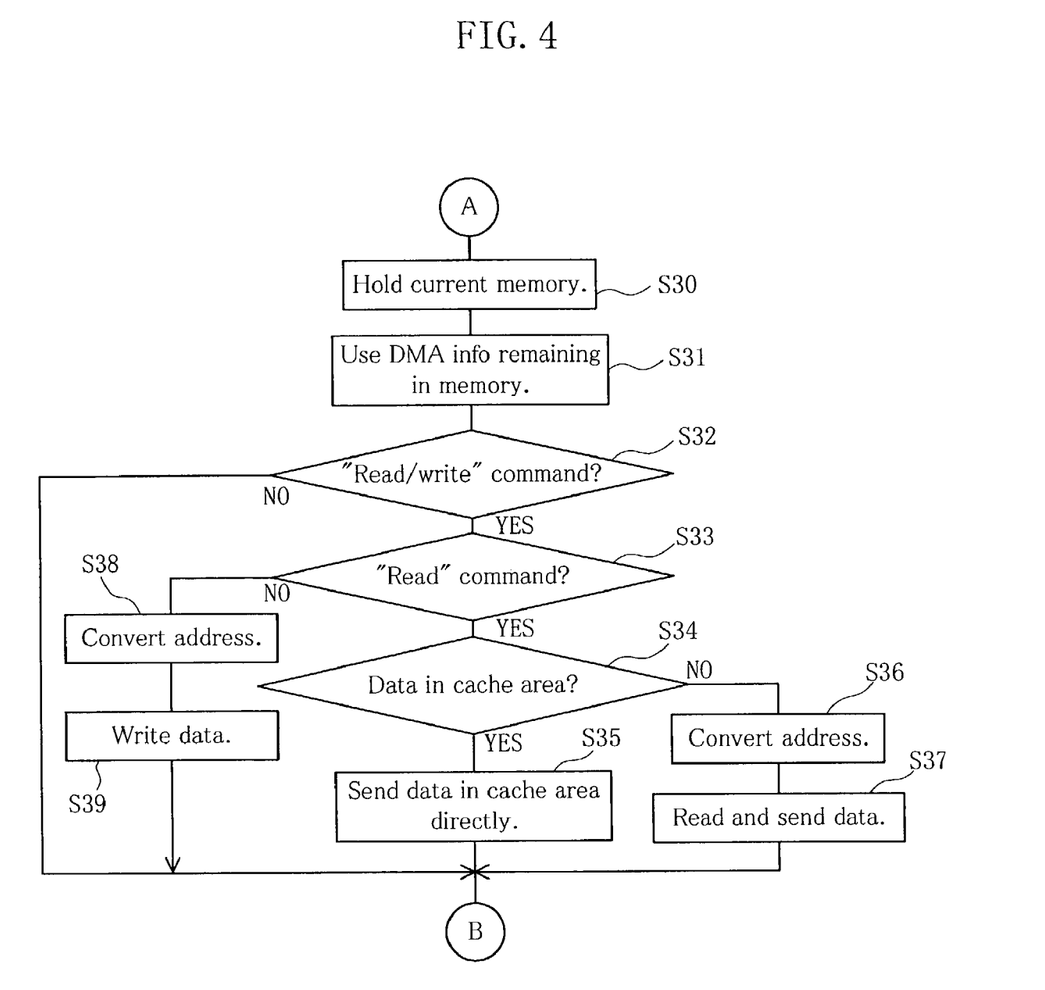
FIG. 4 is a continuation of the flowchart from FIG. 3.

Next, an operation performed from the time of loading a magneto-optical disc to the time of unloading it will be described with reference to a flowchart in FIG. 3 and FIG. 4.

First, when a magneto-optical disc B is loaded into the disc drive A (S10: YES), the CPU 11 begins reading from a control track B1 of the magneto-optical disc B, obtains medium identification information, and stores it in the RAM 12 (S11). Note that the medium identification information obtained at this point is stored in the RAM 12 separately from medium identification information obtained at the previous reading. Note also that when there is no magneto-optical disc B in the disc drive A (S10: NO), the CPU 11 remains in the standby mode until a magneto-optical disc B is inserted.

The CPU 11 then checks if the medium identification information obtained in the latest reading is identical with the medium identification information which is obtained in the previous reading and remaining in the RAM 12 (S12). In this step, in order to see perfect identification, comparison is made not only for the unique information contained as part of the medium identification information but also for the data update number.

When the current medium identification information is not identical with the previous medium identification information (S12: NO), the CPU 11 erases information stored in the RAM 12 (S13). In this step, the medium identification information obtained in the latest reading is not erased, and held in the RAM 12, but contents held in the DMA information storage area 12D and the cache area 12C are erased.

Next, from the medium identification information, the CPU 11 obtains addresses at which DMA information B2 is stored, reads the DMA information B2 at all of the four locations indicated by the addresses, and stores the read information in the DMA information storage area 12D of the RAM 12 (S14). The above series of steps from the insertion of the magneto-optical disc B to here are the steps of loading.

With the above steps, preparation has been made for data reading/writing. When a data reading/writing command comes in, then, from the personal computer C (S15: YES), the CPU 11 checks if the command is for reading of data (S16).

If the command is for reading (S16: YES), then the CPU 11 makes reference to the DMA information B2 in the DMA information storage area 12D, makes address conversion to obtain where to read (S17), reads the data at the location, and transfers it to the personal computer C (S18). For this data transfer, the cache area 12C of the RAM 12 is utilized, and if the requested data is already in the cache area 12C, the data remaining in the cache area 12C is transferred directly.

Then, the CPU 11 checks if there is a command issued for ejection of the magneto-optical disc B, through pressing the EJECT key or through an ejection command from the personal computer C (S19).

If there is the ejection command (S19: YES), the CPU 11 begins an ejecting operation after checking if the data on the magneto-optical disc B has been updated through writing (S20).

If the data has been updated (S20: YES), the CPU 11 revises the data update number by rewriting the medium identification information on the RAM 12 and on the magneto-optical disc B (S21).

Thereafter, the CPU 11 finally begins the ejection operation to eject the magneto-optical disc B (S22), and then finishes the entire process. The above series of steps from the reception of the ejection command to here are the steps of unloading.

When step S20 finds that the data has not been updated (S20: NO), the CPU 11 moves the process to S22, without rewriting the medium identification information.

When step S19 finds that there is no ejection command issued for the magneto-optical disc B (S19: NO), the CPU 11 brings the process back to S15.

When step S16 finds that the command is a writing request (S16: NO), then the CPU 11 makes reference to the DMA information B2 in the DMA information storage area 12D, makes address conversion to obtain where to write (S23), and writes the data transferred from the personal computer C at the location (S24). Then, the personal computer C brings the process to step S19.

When step S15 finds that there is no command from the personal computer C for reading/writing (S15: NO), then the CPU 11 brings the process to S19.

When step S12 finds that the current medium identification information is identical with the previous medium identification information (S12: YES), as shown in FIG. 4, the CPU 11 holds all the information stored in the RAM 12 (S30), and makes the previous DMA information in the DMA information storage area 12D valid for address conversion (S31). In other words, when the same magneto-optical disc B is ejected and then inserted again, the step of reading DMA information from the magneto-optical disc B which is inserted again is skipped, and DMA information obtained in the previous loading is used again. Further, the cache area 12C of the RAM 12 keeps data from the previous loading. Further, information on various parameters about the magneto-optical disc B is also kept in the RAM 12.

Thereafter, when a data reading/writing command comes in from the personal computer C (S32: YES), the CPU 11 checks if the command is for reading of data (S33).

If the command is for reading (S33: YES), then the CPU 11 checks if the requested data is in the cache area 12C (S34) If the data is (S34: YES), the data remaining in the cache area 12C is transferred directly to the personal computer C (S35). Then, the CPU 11 brings the process to S19.

When step S34 finds that the requested data is not in the cache area 12C, (S34: NO), the CPU 11 makes reference to the DMA information B2 in the DMA information storage area 12D, makes address conversion to obtain where to read (S36), reads the data at the location, and transfers it to the personal computer C (S37). Then, the CPU 11 brings the process to S19.

When step S33 finds that the command is a writing request (S33: NO), then the CPU 11 makes reference to the DMA information B2 in the DMA information storage area 12D, makes address conversion to obtain where to write (S38), and writes the data transferred from the personal computer C at the location (S39). Then, the personal computer C brings the process to step S19.

When step S32 finds that there is no command from the personal computer C for reading/writing (S32: NO), then the CPU 11 brings the process to S19.

Therefore, according to the first embodiment, when a magneto-optical disc B is ejected and then re-inserted for reading/writing of data, the step of reading DMA information B2 is not performed in the second loading of the magneto-optical disc B, and accordingly the time necessary for the loading is reduced or shorter than in the first time. When a command is issued for reading/writing of data upon the second loading of the magneto-optical disc B, it is now possible to begin data transfer with the personal computer C without a seek operation, making possible to reduce response time accordingly.

Likewise, when a magneto-optical disc B is ejected and then re-inserted for reading/writing of data, it is now possible to use previous data remaining in the cache area 12C even after the second loading. When data is to be read upon the second loading of the magneto-optical disc B, the data can be hit in the cache area 12C at a high probability, making possible to reduce response time accordingly.

Figure 6:
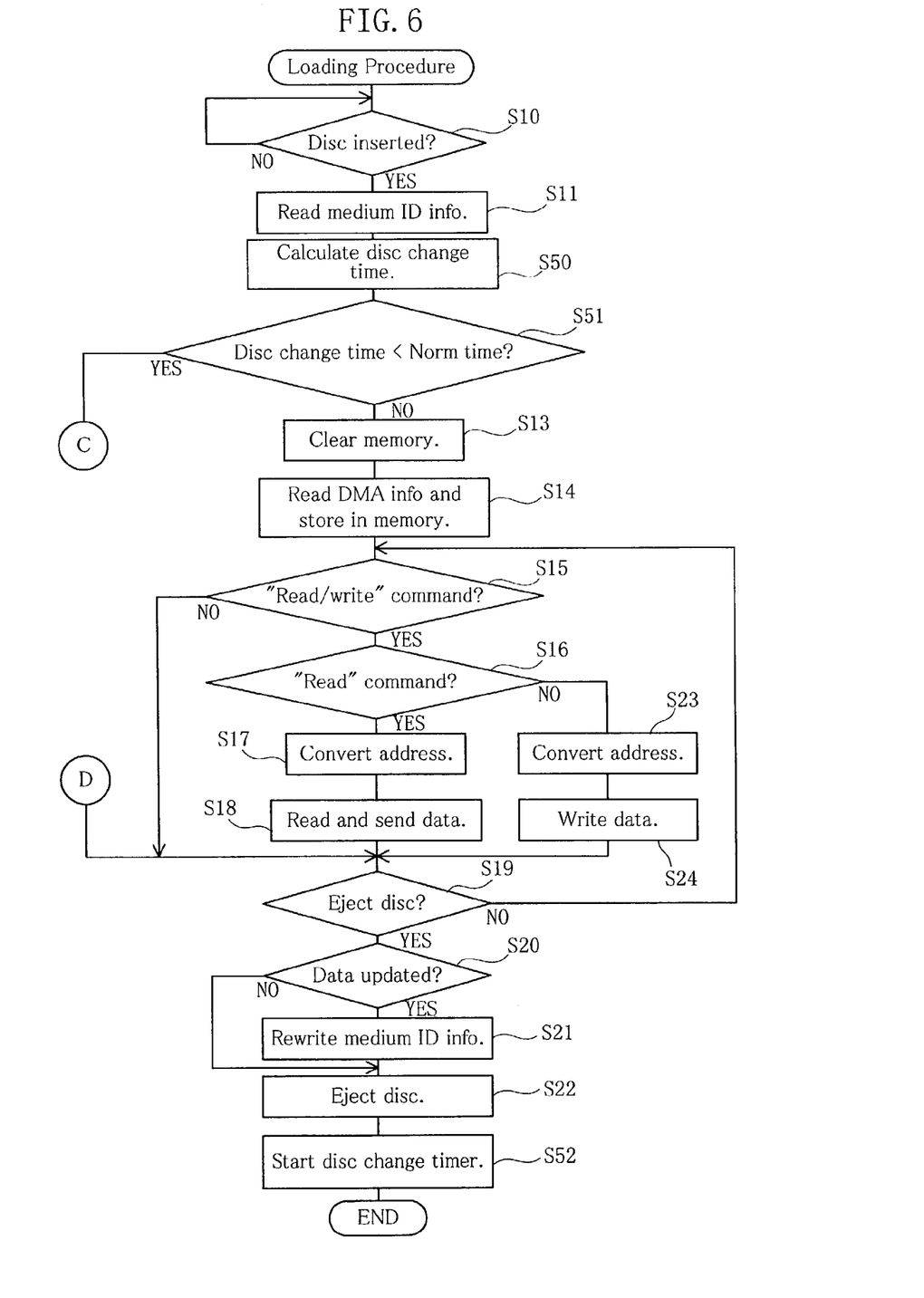
FIG. 6 is a flowchart according to the second embodiment.
Figure 7:
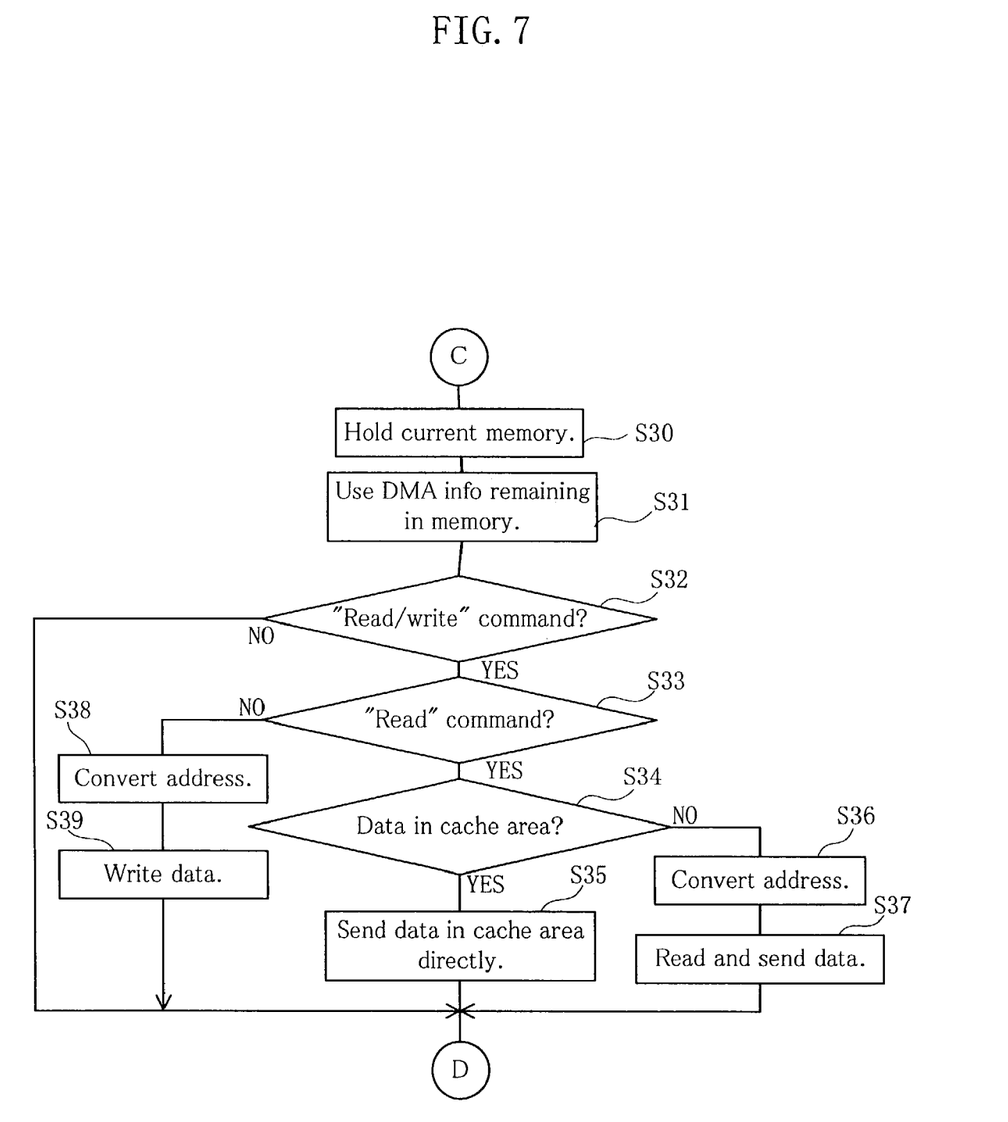
FIG. 7 is a continuation of the flowchart from FIG. 6.

Next, a second embodiment of the present invention will be described with reference to FIG. 5 through FIG. 7. It should be noted first that in terms of physical configuration the second embodiment does not differ from the first embodiment, and therefore, no more description will be made for those identical with the first embodiment in FIG. 1.

Figure 5:
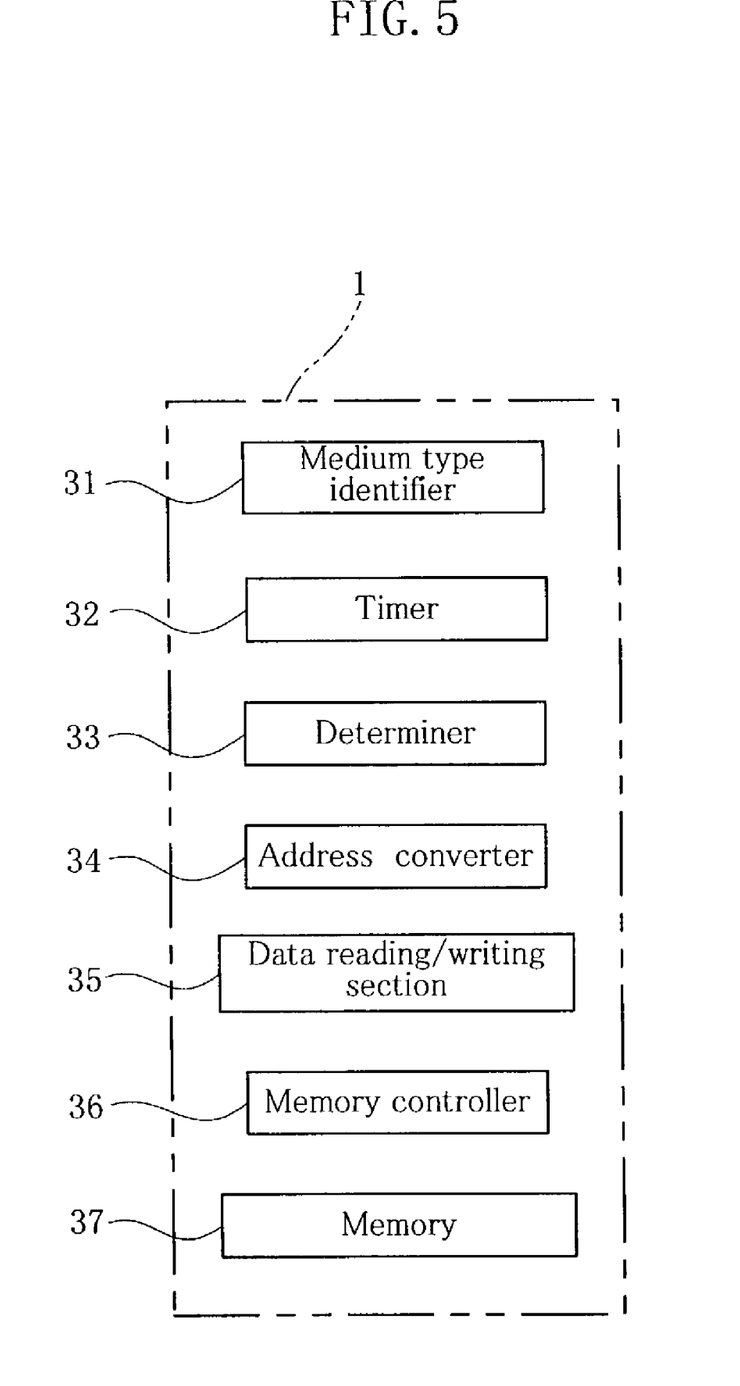
FIG. 5 is a function block diagram of a disc drive according to a second embodiment of the present invention.

As shown in FIG. 5, according to the second embodiment, the controller 1 includes a medium type identifier 31, a timer 32, a determiner 33, an address converter 34, a data reading/writing section 35, a memory controller 36, and a memory 37. Specifically, the CPU 11 provides the medium type identifier 31, the timer 32, the determiner 33, the address converter 34, the data reading/writing section 35, and the memory controller 36. The RAM 12 provides the memory 37.

The medium type identifier 31, the address converter 34 and the data reading/writing section 35 have the same function as those described in the first embodiment.

The timer 32 measures a disc changing time from ejection of a magneto-optical disc B to the next insertion of a magneto-optical disc B.

The determiner 33 is called up at the time of loading a magneto-optical disc B, and checks if the disc changing time measured by the timer 32 is longer than a predetermined norm time. The norm time is a time too short to change an ejected magneto-optical disc B with another, i.e. not more than a few seconds.

The memory controller 36, which is called up when the determiner 33 has found that the disc changing time is longer than the norm time, have the address converter 34 read DMA information B2, and then replace the previous DMA information B2 remaining in the DMA information storage area 12D of the RAM 12, with the newly obtained DMA information B2. On the other hand, when the determiner 33 has found that the disc changing time is not longer than the norm time, the memory controller 36 does not have the address converter 34 read DMA information B2 in the current loading process, and makes the previous DMA information B2 remaining in the DMA information storage area 12D of the RAM 12 available for use.

Further, when the determiner 33 has found that the disc changing time is longer than the norm time, the memory controller 36 invalidates data remaining in the cache area 12C of the RAM 12 in the current loading, and erase the data in the cache area. 12C. On the other hand, when the determiner 33 has found that the disc changing time is not longer than the norm time, the memory controller 36 validates data remaining in the cache area 12C of the RAM 12 in the current loading, for continued use.

Next, an operation performed from the time of loading a magneto-optical disc to the time of unloading it will be described with reference to a flowchart in FIG. 6 and FIG. 7. Note that description will be made primarily on differences from the process shown in FIG. 3 and FIG. 4.

After reading medium identification information from the magneto-optical disc B and storing the information in the RAM 12 in step S11, The CPU 11 calculates the disc changing time (S50). As will be described later, the disc changing time is a time counted by the timer which starts counting upon ejection of the magneto-optical disc B and continues the counting until a next magneto-optical disc B is inserted.

The CPU 11 checks if the disc changing time is shorter than the predetermined norm time (S51).

When the disc changing time is longer than the norm time (S51: NO), the CPU 11 erases information stored in the RAM 12 (S13). In this step, the medium identification information obtained in the latest reading is not erased, but held in the RAM 12, whereas contents in the DMA information storage area 12D and the cache area 12C are erased.

Steps S14 through S24 are the same as in the first embodiment, differing only in that in step S22, upon commencement of the ejecting operation for ejecting the magneto-optical disc B, the CPU 11 starts the timer for counting the disc changing time (S52). In other words, the disc changing time is counted as a time for which there is no magneto-optical disc B in the disc drive A.

When S51 finds that the disc changing time is not shorter than the norm time (S51: YES), as shown in FIG. 6, the CPU 11 holds all the information stored in the RAM 12 (S30), and makes the previous DMA in the DMA information storage area 12D available for address conversion (S31). In other words, when a magneto-optical disc B is inserted within a time too short for the user to change to a different magneto-optical disc B, the step of reading DMA information from the magneto-optical disc B which is inserted is skipped, and DMA information obtained in the previous loading is used again. Further, the cache area 12C of the RAM 12 keeps previous data.

Thereafter, steps S32 through S39 are the same as in the first embodiment.

Therefore, according to the second embodiment, when a magneto-optical disc B is ejected and then re-inserted within a short time for reading/writing of data, the step of reading DMA information B2 is not performed in the second loading of the magneto-optical disc B, and accordingly the time necessary for the loading is reduced or shorter than in the first time. When a command is issued for reading/writing of data upon the second loading of the magneto-optical disc B, it is now possible to begin data transfer immediately with the personal computer C without a seek operation, making possible to reduce response time accordingly.

Likewise, when a magneto-optical disc B is ejected and then re-inserted within a short time for reading/writing of data, it is now possible to use previous data remaining in the cache area 12C even after the second loading. When data is to be read upon the second loading of the magneto-optical disc B, the data can be hit in the cache area 12C at a high probability, making possible to reduce response time accordingly.

The present invention is not limited by the above embodiments.

For example, the recording disc may not be limited to the MOs, but can include MDs and a variety of iD-format magneto-optical discs. Further, the present invention is applicable to other kinds of discs such as optical discs of the phase-change type, the write-once type and so on, including for example DVDs and CD-ROMs, as well as to magnetic discs such as hard discs and floppy discs.

Further, according to the second embodiment, disc changing time is the only basis for selection between holding or erasing the contents of the memory. Alternatively, for example, the control algorithm may include a step used in the first embodiment. Specifically, even if the disc changing time is longer than the norm time, the process checks if the current medium identification information is the same as the previous medium identification information, and the selection is made upon a result of the check.

The description given so far above illustrates steps up to the second loading of a magneto-optical disc B. However, the same applies to the third loading and thereafter.

The invention claimed is:

1. A disc drive for data transfer between a recording disc and a host, the disc drive reading and storing in a memory DMA information including medium identification information unique to the recording disc and a list of addresses indicating defective areas upon loading the recording disc, and performing address conversion with reference to the DMA information for the data transfer, comprising:

a determiner for checking if the medium identification information obtained when loading the recording disc is identical with or different from medium identification information obtained in a previous loading; and a memory controller for allowing the reading of DMA information and replacing the previous DMA information remaining in the memory with the obtained DMA information only when the determiner has found that the obtained medium identification information is different from the previous medium identification information.

2. A disc drive for data transfer between a recording disc and a host via a cache memory, the disc drive reading medium identification information unique to the recording disc upon loading the recording disc, comprising:
   a determiner for checking if the medium identification information obtained when loading the recording disc is identical with or different from medium identification information obtained in a previous loading; and
   a memory controller for invalidating data remaining in the cache memory only when the determiner has found that the obtained medium identification information is different from the previous medium identification information.

3. A disc drive for data transfer between a recording disc and a host, the disc drive reading and storing in a memory DMA information including a list of addresses indicating defective areas upon loading the recording disc, and performing address conversion with reference to the DMA information for the data transfer, comprising:
   a timer for measuring a disc changing time from a time of unloading a previous recording disc to a present time in the loading of the current recording disc;
   a determiner for checking if the disc changing time measured by the timer is longer than a predetermined norm time; and
   a memory controller for allowing the reading of DMA information and replacing the previous DMA information remaining in the memory with the obtained DMA information only when the determiner has found that the disc changing time is longer.

4. A disc drive for data transfer between a recording disc and a host via a cache memory after loading the disc, comprising:
   a timer for measuring a disc changing time from a time of unloading a previous recording disc to a present time in the loading of the current recording disc;
   a determiner for checking if the disc changing time measured by the timer is longer than a predetermined norm time; and
   a memory controller for invalidating data remaining in the cache memory only when the determiner has found that the disc changing time is longer.

5. A recording disc loading control method for data transfer between a recording disc and a host, the method comprising reading and storing in a memory DMA information including medium identification information unique to the recording disc and a list of addresses indicating defective areas upon loading the recording disc, and performing address conversion with reference to the DMA information for the data transfer, the method further comprising:
   a determining step of checking if the medium identification information obtained when loading the recording disc is identical with or different from medium identification information obtained in a previous loading; and
   a memory controlling step of allowing the reading of DMA information and replacing the previous DMA information remaining in the memory with the obtained DMA information only when the obtained medium identification information has been found to be different from the previous medium identification information.

6. A recording disc loading control method for data transfer between a recording disc and a host via a cache memory, the method comprising reading medium identification information unique to the recording disc upon loading the recording disc, the method further comprising:
   a determining step of checking if the medium identification information obtained when loading the recording disc is identical with or different from medium identification information obtained in a previous loading; and
   a memory controlling step of invalidating data remaining in the cache memory only when the obtained medium identification information has been found to be different from the previous medium identification information.

7. A recording disc loading control method for data transfer between a recording disc and a host, the method comprising reading and storing in a memory DMA information including a list of addresses indicating defective areas upon loading the recording disc, and performing address conversion with reference to the DMA information for the data transfer, the method further comprising:
   a time measuring step of measuring a disc changing time from a time of unloading a previous recording disc to a present time in the loading of the current recording disc;
   a determining step of checking if the disc changing time measured by the timer is longer than a predetermined norm time; and
   a memory controlling step of allowing the reading of DMA information and replacing the previous DMA information remaining in the memory with the obtained DMA information only when the disc changing time has been found to be longer.

8. A recording disc loading control method for data transfer between a recording disc and a host via a cache memory after loading the disc, comprising:
   a time measuring step of measuring a disc changing time from a time of unloading a previous recording disc to a present time in the loading of the current recording disc;
   a determining step of checking if the disc changing time measured by the timer is longer than a predetermined norm time; and
   a memory controlling step of invalidating data remaining in the cache memory only when the disc changing time has been found to be longer.

9. A disc drive for data transfer between a recording disc and a host, the disc drive reading and storing in a memory DMA information including medium identification information unique to the recording disc and a list of addresses indicating defective areas upon loading the recording disc, and performing address conversion with reference to the DMA information for the data transfer, comprising:
   a determiner checking if the medium identification information obtained when loading the recording disc is identical with or different from medium identification information obtained in the previous loading; and
   a memory controller allowing the reading of DMA information and replacing the previous DMA information remaining in the memory with the obtained DMA information only when the determiner has found that the obtained medium identification information is different from the previous medium identification information, the memory controller making the previous DMA information remaining in the memory available for use with the loaded recording disc when the determiner has found that the obtained medium identification information is identical with the previous medium identification information.

10. A disc drive for data transfer between a recording disc and a host via a cache memory, the disc drive reading medium identification information unique to the recording disc upon loading the recording disc, comprising:
   a determiner checking if the medium identification information obtained when loading the recording disc is identical with or different from medium identification information obtained in the previous loading; and
   a memory controller invalidating data remaining in the cache memory only when the determiner has found that the obtained medium identification information is different from the previous medium identification information the memory controller making the data remaining in the cache memory available for use with the loaded recording disc when the determiner has found that the obtained medium identification information is identical with the previous medium identification information.

11. A recording disc loading control method for data transfer between a recording disc and a host, the method comprising reading and storing in a memory DMA information including medium identification information unique to the recording disc and a list of addresses indicating defective areas upon loading the recording disc, and performing address conversion with reference to the DMA information for the data transfer, the method further comprising:
   a determining step of checking if the medium identification information obtained when loading the recording disc is identical with or different from medium identification information obtained in a previous loading; and
   a memory controlling step of allowing the reading of DMA information and replacing the previous DMA information remaining in the memory with the obtained DMA information only when the determiner has found that the obtained medium identification information is different from the previous medium identification information, the memory controlling step making the previous DMA information remaining in the memory available for use with the loaded recording disc when the obtained medium identification information has been found to be identical with the previous medium identification information.

12. A recording disc loading control method for data transfer between a recording disc and a host via a cache memory, the method comprising reading medium identification information unique to the recording disc upon loading the recording disc, the method further comprising:
   a determining step of checking if the medium identification information obtained when loading the recording disc is identical with or different from medium identification information obtained in a previous loading; and
   a memory controlling step of invalidating data remaining in the cache memory only when the obtained medium identification information has been found to be different from the previous medium identification information, the memory controlling step making the data remaining in the cache memory available for use with the loaded recording disc when the obtained medium identification information has been found to be identical with the previous medium identification information.

13. A disc drive for data transfer between a recording disc and a host, the disc drive reading and storing in a memory DMA information including medium identification information unique to the recording disc and a list of addresses indicating defective areas upon loading the recording disc, and performing address conversion with reference to the DMA information for the data transfer, comprising:
   a determiner checking if the medium identification information obtained when loading the recording disc is identical with or different from medium identification information obtained in a previous loading; and
   a memory controller allowing the reading of DMA information and replacing the previous DMA information remaining in the memory with the obtained DMA information only when the determiner has found that the obtained medium identification information is different from the previous medium identification information.

14. A disc drive for data transfer between a recording disc and a host via a cache memory, the disc drive reading medium identification information unique to the recording disc upon loading the recording disc, comprising:
   a determiner checking if the medium identification information obtained when loading the recording disc is identical with or different from medium identification information obtained in a previous loading; and
   a memory controller invalidating data remaining in the cache memory only when the determiner has found that the obtained medium identification information is different from the previous medium identification information.

15. A disc drive for data transfer between a recording disc and a host, the disc drive reading and storing in a memory DMA information including a list of addresses indicating defective areas upon loading the recording disc, and performing address conversion with reference to the DMA information for the data transfer, comprising:
   a timer measuring a disc changing time from a time of unloading a previous recording disc to a present time in the loading of the current recording disc;
   a determiner checking if the disc changing time measured by the timer is longer than a predetermined norm time; and
   a memory controller allowing the reading of DMA information and replacing the previous DMA information remaining in the memory with the obtained DMA information only when the determiner has found that the disc changing time is longer.

16. A disc drive for data transfer between a recording disc and a host via a cache memory after loading the disc, comprising:
   a timer measuring a disc changing time from a time of unloading a previous recording disc to a present time in the loading of the current recording disc;
   a determiner checking if the disc changing time measured by the timer is longer than a predetermined norm time; and
   a memory controller invalidating data remaining in the cache memory only when the determiner has found that the disc changing time is longer.

* * * * *